US007130430B2

(12) United States Patent
Milsap

(10) Patent No.: US 7,130,430 B2
(45) Date of Patent: Oct. 31, 2006

(54) PHASED ARRAY SOUND SYSTEM

(76) Inventor: Jeffrey P. Milsap, 207 Canterbury Ct., Cambridge, WI (US) 53523

( * ) Notice: Subject to any disclaimer, the term of this patent is extended or adjusted under 35 U.S.C. 154(b) by 802 days.

(21) Appl. No.: 10/024,159

(22) Filed: Dec. 18, 2001

(65) Prior Publication Data

US 2003/0185404 A1 Oct. 2, 2003

(51) Int. Cl.
*H04B 3/00* (2006.01)

(52) U.S. Cl. ............................ 381/77; 381/79; 381/80; 381/82

(58) Field of Classification Search .................. 381/77, 381/79, 80, 82, 387
See application file for complete search history.

(56) References Cited

U.S. PATENT DOCUMENTS

| | | | | |
|---|---|---|---|---|
| 4,359,944 | A | 11/1982 | Stiennon | |
| 4,515,997 | A | 5/1985 | Stinger, Jr. | |
| 4,789,801 | A | 12/1988 | Lee | |
| 5,020,155 | A * | 5/1991 | Griffin et al. | 381/79 |
| 5,109,416 | A | 4/1992 | Croft | |
| 5,404,406 | A | 4/1995 | Fuchigami et al. | |
| 5,521,981 | A | 5/1996 | Gehring | |
| 5,596,649 | A | 1/1997 | Liu | |
| 5,668,884 | A | 9/1997 | Clair, Jr. et al. | |
| 5,781,645 | A | 7/1998 | Beale | |
| 5,889,870 | A | 3/1999 | Norris | |
| 5,949,894 | A | 9/1999 | Nelson et al. | |
| 5,974,152 | A | 10/1999 | Fujinami | |
| 6,016,353 | A | 1/2000 | Gunness | |
| 6,163,613 | A | 12/2000 | Cowans | |
| 6,263,083 | B1 * | 7/2001 | Weinreich | 381/97 |
| 6,373,955 | B1 | 4/2002 | Hooley | |
| 6,434,239 | B1 | 8/2002 | DeLuca | |
| 2001/0007591 | A1 * | 7/2001 | Pompei | 381/111 |
| 2001/0043652 | A1 | 11/2001 | Hooley | |
| 2002/0012442 | A1 | 1/2002 | Azima et al. | |
| 2002/0106093 | A1 | 8/2002 | Azima et al. | |
| 2002/0131608 | A1 * | 9/2002 | Lobb et al. | 381/111 |
| 2003/0031333 | A1 * | 2/2003 | Cohen et al. | 381/303 |

OTHER PUBLICATIONS

"An Audio Spotlight creates a Personal Wall of Sound", Jennifer 8. Lee, New York Times on the Web www.nytimes.com, © 2001 New York Times Company.
"Time-Reversed Acoustics", Mathias Fink, Scientific American, Nov. 1999, pp. 91-97.
"Out of Thin Air", Trudy E. Bell, IEEE Spectrum, Feb. 1997.
"A sound idea? Grad student's audio spotlight has companies' ears", Jennifer 8. Lee, Milwaukee Journal Sentinel, May 28, 2002, pp. G1, G3.

* cited by examiner

*Primary Examiner*—Brian T. Pendleton
(74) *Attorney, Agent, or Firm*—Stiennon & Stiennon

(57) ABSTRACT

An array of speakers are fed from a single source of audio frequency sound but each speaker transmits the sound delayed by an amount which is determined by the distance between a particular speaker and a selected region in space, so that sound from each speaker constructively adds at the selected region in space. A sufficiently large number of speakers are employed so that when sound reaches a region in space at the same moment in time the audio volume will be increased substantially over sound in regions where there is not constructive interference. This simple technique allows audio frequency sound to be heard in only selected regions within the room or other auditory space. Multiple regions with multiple soundtracks can be created by simultaneously playing variously delayed soundtracks over each of the speakers in the array.

19 Claims, 3 Drawing Sheets

PHASED ARRAY SOUND SYSTEM

CROSS REFERENCES TO RELATED APPLICATIONS

None.

STATEMENT AS TO RIGHTS TO INVENTIONS MADE UNDER FEDERALLY SPONSORED RESEARCH AND DEVELOPMENT

None.

BACKGROUND OF THE INVENTION

The present invention relates to systems for reproducing sound in general and to systems which can control sound production to localized regions in particular.

A typical sound system performs two functions: amplifying sound and reproducing sound with a given level of clarity or intelligibility within a particular room, auditorium, hall or other space. Sound may be either audio frequency sound, subsonic sound, or ultrasonic sound. The audio frequency sound falls within the range of 15 Hz to 20,000 Hz, the range generally of human hearing, with subsonic frequencies being those below 15 Hz, and ultrasonic frequencies being those above 20,000 Hz.

Recently new capabilities have led to research in sound systems which could have the potential to produce sound which is contained within a beam, or which is aimed at a particular point or listener. Such systems open up the possibility of providing different audio stimulus to different people occupying the same room, museum, or lecture hall. Such a system might also provide more realistic stereo without using headphones by providing a separate audio input to each ear of a listener.

One approach proposed by Joe Pompei while a student at MIT, involves generation of ultrasonic sound which distorts in a predictable way so that the distortions produce audio frequency sound. Starting with the desired audio frequency sound it is mathematically possible to predict the ultrasonic beam which will produce the desired audio frequency sound. By such means Pompei is able to generate an audio spotlight of sound.

Another proposed approach is to use an acoustic time-reversal mirror. Such systems have been developed by Mathias Fink at Ecole Superieure de Physique et de Chimie Industrielles de la Ville de Paris. A time-reversal mirror is a concept known from optics where it is known to be possible to construct a mirror which sends light reflected therefrom directly backwards so that the lightwaves appear to be reversed in time. Thus light emitted from a point when reflected in a phase conjugate, or time-reversal mirror, returns to the emitting point. To look into a time-reversal mirror is to see only the light emitted from the pupil which is gazing into the mirror. In a similar way, an acoustic time reversal mirror returns sound to the source that emitted the sound. This returning sound returns identically to that emitted, even if the path between the sound source and the time-reversal mirror involves many reflections, distortions, and dispersions. At least in theory, the time reversal process could be used to focus sound at a particular location so that different sounds would be heard by different people.

A wide variety of audio systems attempt to provide more realistic sound by providing an array of speakers which produce the effect that the sound appears to come from a particular direction or source and such systems are described in U.S. Pat. No. 5,521,981 to Gehring or U.S. Pat. No. 5,974,152 to Fujinami. More generally, any stereo, quadraphonic, or surround sound system uses multiple speakers to produce sound which is more realistic.

However, none of the foregoing systems has produced a cost-effective system for providing sound which can only be heard in a localized region. What is needed is an apparatus and method for producing audible sounds which are localized so that multiple listeners can be provided with unique audio input without the use of headphones.

SUMMARY OF THE INVENTION

The sound reproduction system of this invention employs an array of speakers to produce audio frequency sound. The speakers are fed from a single audio source, but each speaker transmits sound delayed by an amount which is related to the distance between a particular speaker and a selected point or region in space. In addition the amplitude of the sound output by each speaker may also be proportional to the distance between the particular speaker and a selected point or region in space. In one embodiment the audio output of each speaker can be below the audible threshold. An array of speakers is arranged on the ceiling or walls or even randomly distributed within the room. With such an arrangement the output from any given speaker cannot be heard. However, if each speaker has its output delayed such that even though the sound from each speaker in the array travels a different distance, the sound from all the speakers nevertheless reaches a single point or region in space at the same moment in time, the audio volume will be increased in proportion to the square of the number of speakers employed in the array. Thus, with a sufficient number of speakers producing inaudible volume levels of sound, at a particular region the sound will be readily audible. This simple technique allows audio frequency sound to be heard in only selected regions within the room or other auditory space.

This method achieves the result that the wave front from each speaker arrives at the target at the same time and roughly in phase. Due to superposition, the amplitudes of the wave-fronts will add algebraically. Sound intensity or volume is a function of the square of the signal amplitude, therefore very significant sound intensities at the target can be achieved for reasonable sized arrays.

A time varying audio stream of sound is digitized into a multiplicity of discrete digital samples similar to those used in digital recording systems such as those used in producing compact discs or digital audio tape.

The speed of sound in air, although varying with air temperature, is approximately 1,000 feet per second (fps). For a room having a maximum linear dimension of 40 feet, sound can travel from any speaker to any point in the room in 0.04 seconds. If sound is digitized at 44 kilohertz—the standard for most digital sound preproduction—approximately 1,760 sound samples are produced during 0.04 seconds.

If we now consider an array of speakers we can calculate the distance between each speaker in the array and a selected point in the room. A computer or similar device is used to continuously store 1,760 sequential sound samples, in 1760 storage registers, which are being incremented by one sample every $1/44{,}000$ of second, corresponding to the sound sample interval. We can produce a digital sample stream for generating an audio drive signal for a particular speaker which is delayed by any amount within the 0.04 seconds, simply by reading out the value of a particular memory every sample cycle, i.e. every $1/44{,}000$ of a second from the particular memory which corresponds to the selected time delay. The time delay is selected to correspond to the distance between a particular speaker and the point or region in space where it is desired to create a clearly audible sound. In particular, the distance between a particular speaker and the point or region in space is subtracted from the distance of the furthest speaker which has zero time delay and the result is divided by 1000 (the speed of sound) and multiplied by 44,000 which will give the number of the sound storage register, out of the 1760 sound storage registers, which will produce a digital output corresponding to an audio signal which has been delayed by a length of time such that all sound signals reach the same point at the same time.

It is an object of the present invention to provide a sound system which can produce one or more localized regions of audible sound.

It is another object of the present invention to produce a sound system where different persons within the same room can hear distinctly different soundtracks and cannot hear any soundtrack but the one directed at them.

It is a further object of the present invention to provide a sound system which does not produce clearly audible sound except within selected regions.

It is a yet further object of the present invention to provide a sound system where an array of speakers operating at a first sound level produces sound at selected points or regions in space at least an order of magnitude louder than the first sound level.

Further objects, features and advantages of the invention will be apparent from the following detailed description when taken in conjunction with the accompanying drawings.

DESCRIPTION OF THE PREFERRED EMBODIMENTS

Figure 1:
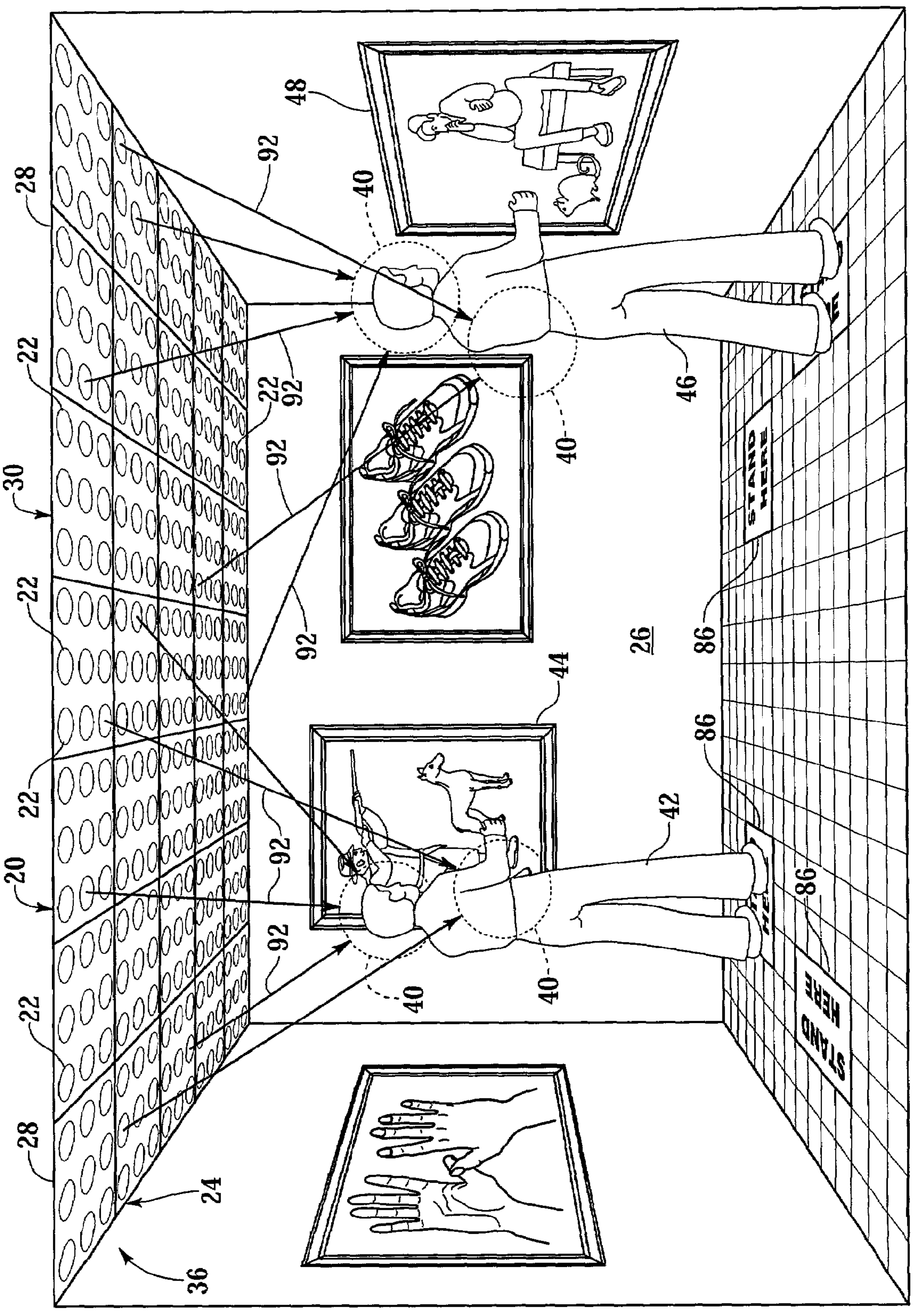
FIG. 1 is pictorial perspective view of the sound reproduction system of this invention.
Figure 4:
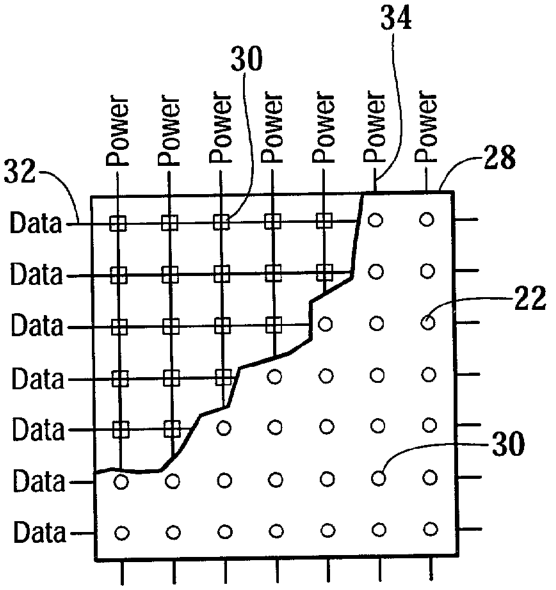
FIG. 4 is a schematic plan view of a ceiling tile incorporating a multiplicity of discrete speakers which form part of the sound reproduction system of FIG. 1.

Referring more particularly to FIGS. 1–4, wherein like numbers refer to similar parts, an array 20 containing a multiplicity of audio speakers 22 acting as audio frequency sound sources, is positioned on the ceiling 24 of a room or gallery 26 of a museum. As shown in FIGS. 1 and 4, the ceiling 24 consists of multiple tiles 28 each tile containing a sub-array 30 of speakers 22 which are connected by data transmission lines 32 and power supply lines 34, to each other so that power and data can be communicated between the tiles 28. In a typical arrangement of speakers 22, hundreds to over one thousand discrete speakers are used to create a sound reproduction system 36 with the ability to produce audio signals which are only audible, or substantially more audible, within selected discrete regions 40. The speakers 22 of the array 20 are driven so as to produce regions 40 of constructive interference, as set out in greater detail below. These regions 40 of constructive interference allow one person 42 standing next to a first picture 44 to hear one soundtrack, and a second person 46 standing next to a second picture 48 to hear a second soundtrack.

The apparent loudness of a sound is found by forming a ratio between a sound volume which is just perceptible to the human ear, and the sound in question. For convenience, this ratio is expressed as ten times the log of the ratio of sound intensity which is referred to as decibels or dB. A sound which has a power level of ten times a first sound seems to the human ear to be about twice as loud as the first sound. Thus if the sound intensity ratio is 20 dB the sound will sound four times as loud as the 0 dB sound.

Sound intensity or volume is a function of the square of the signal amplitude, therefore in an array containing 100 to 1,000 speakers, the sound from all of which is made to constructively interfere at a region in space, the interference will produce by the constructive addition of the sound from each speaker an increase in sound amplitude of ten thousand to one million times, theoretically achieving an increase of intensity at the target of 40 dB to 60 dB over the volume of any one speaker as heard from the same location.

The sound intensity at locations other than the target location is a function of sound addition which is not in phase, but rather randomly distributed in phase and timing, and is proportional to the number of speakers or transducers in the array rather than the square of the number of speakers or transducers. Thus, where the sound is not constructively added, the sound level will be 20 dB to 30 dB over the volume of any one speaker as heard from the same location. The resulting difference in sound intensity levels if each speaker were to be operated at a sound level of 0 dB or the threshold of audibility would be that at everywhere in the listening space except the target, the out-of-phase and unintelligible signal would have a sound volume of a faint whisper or the sound of rustling leaves while at the target a fully intelligible, focused and in-phase signal would have a sound intensity level nearly equal to that of normal conversation, to several times normal conversation level.

Thus the perceived sound intensity, depending on the number of speakers, will be approximately four to eight times as loud in the discrete regions 40 where constructive interference is occurring as outside the discrete regions 40. The addition of some white noise which decreases audibility for all sounds will result in distinct noticeable and intelligible sound only in discrete regions 40.

In a natural whispering chamber such as an ellipsoidal room having two foci, sound emitted at one focus at a sound level which cannot be heard a short distance away, will nevertheless be clearly audible at the second focus of the ellipsoidal room. In the whispering chamber, sound is reflected to a region in space where constructive addition forms an audible sound. Just as a localized region of audible sound can be produced by the natural reflective properties of an ellipsoidal room, which cause every first reflection of a sound from the first focus to reach the second focus at the same time, and add together to produce a localized region of audible sound, a similar effect can be achieved artificially with an array of speakers.

The audio speaker array 20 is driven to produce sound so that the sound from each speaker reaches a discrete region 40 in space at the same time. If many audio speakers were arranged facing inwardly on the surface of a sphere and the same sound signal is then broadcast through each speaker, a person standing at the center of the sphere will perceive a signal created by the constructive interference of all the speakers which is louder than the mere algebraic sum of the volume of each speaker.

If a single speaker located on the sphere surface is given a first sound level as heard from the center of the sphere, ten speakers at the same volume without constructive interference would normally sound twice as loud (10 dB). However, if the ten speakers are placed on the sphere's surface to result in constructive interference, a sound amplitude of ten squared (20 dB) will be perceived, or a sound four times as loud as the single speaker. Similarly, if 100 speakers are use, a sound amplitude of 100 squared (40 dB) will be perceived, a sound 16 times as loud as a single speaker will be perceived.

Figure 2:
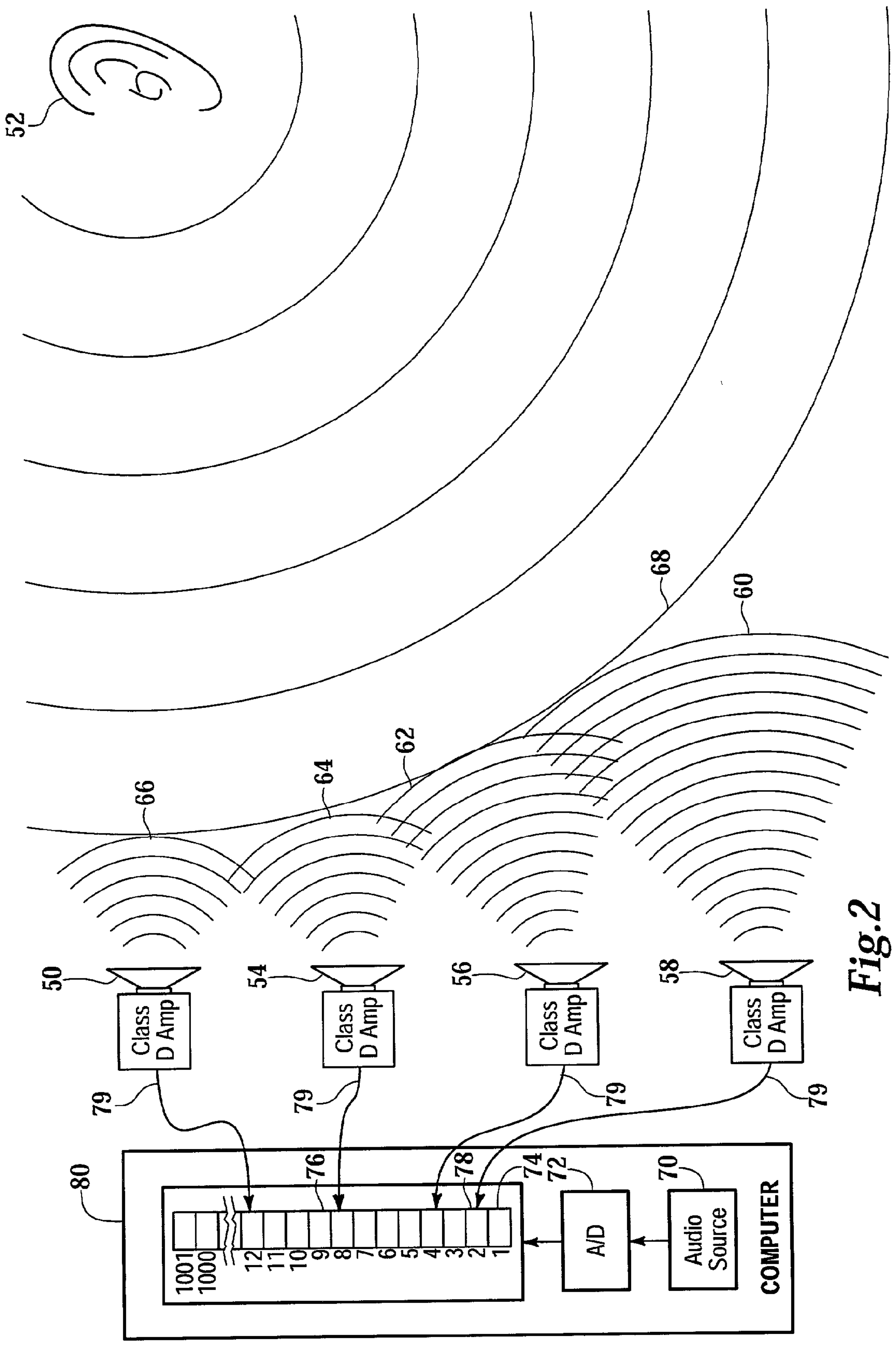
FIG. 2 is a schematic view of how the sound reproduction system of FIG. 1 produces a discrete region of sound which is spaced from the speakers which generate a sound pattern.
Figure 3:
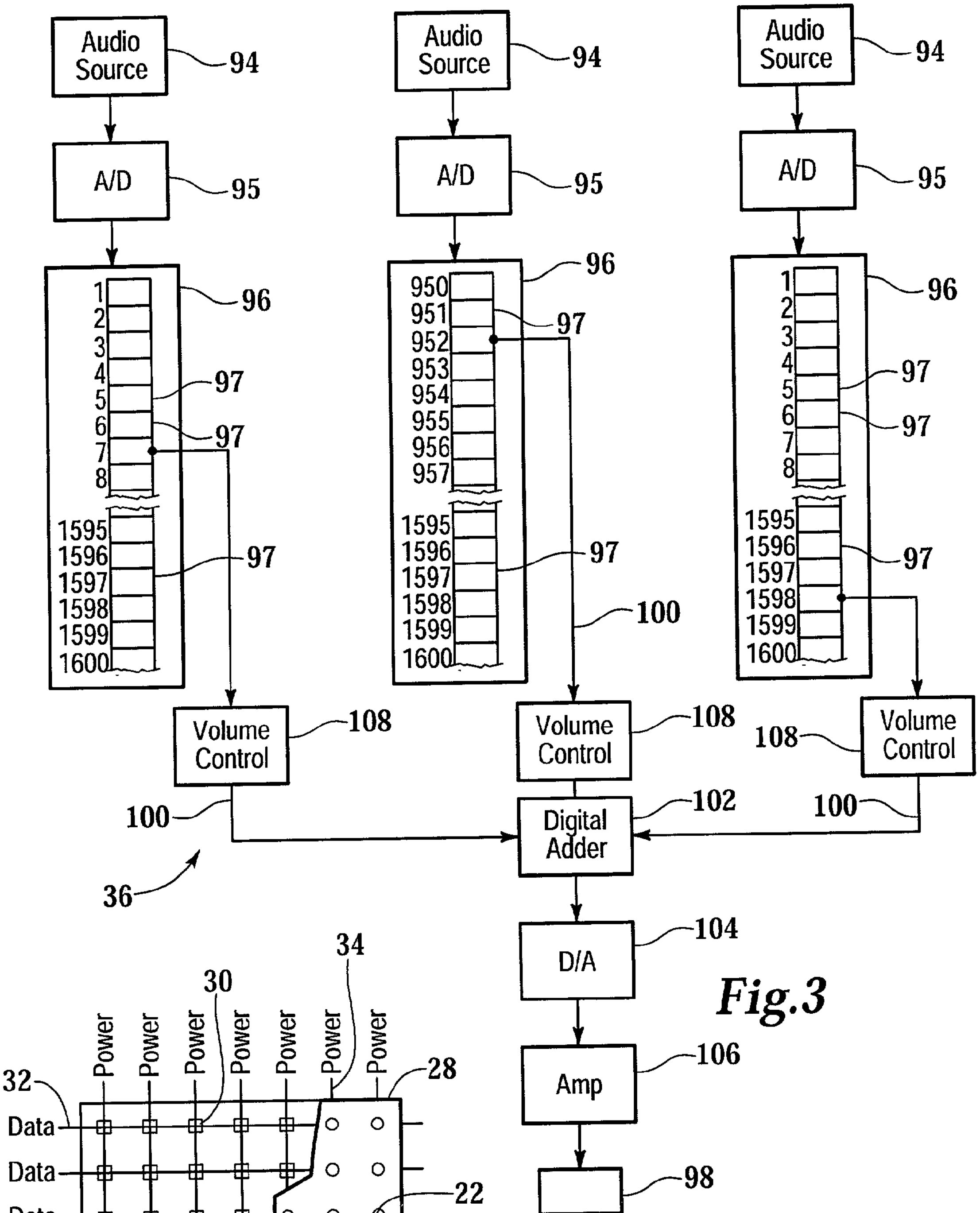
FIG. 3 is a schematic view of how sound from different audio sources is combined and transmitted through a single speaker to produce sound output which will contribute to forming multiple discrete regions of sound which are separated in space.

A flat array 20 such as shown in FIG. 1 and FIG. 2 can be made to simulate or have the effect of an array of speakers on a sphere by providing each speaker with a signal which is delayed in time, so that the signal from each speaker reaches a common focus at the same time. This means that speakers that are nearer the focus must have more delay than the speakers which are farther from the focus. If the speaker furthest from the common focus region 40 has no delay, the speaker nearest the common focus must have the delay which is equal to the difference in distance between the nearest and furthest speakers divided by the speed of sound. Thus the minimum amount of delay which the system must be capable of producing is the maximum range of distances between the speakers 22 and the discrete region divided by the speed of sound. To avoid needing to vary the maximum delay provided by the sound reproduction system 36 depending on the location within the room 26, a maximum delay is selected equivalent to the maximum dimension of the array 20.

The delay required for each speaker can be calculated by determining the distance $D_{max}$ between the speaker furthest from the common focus 40, and setting the delay for the furthest speaker equal to zero or a constant. The distance $D_1$ for any particular speaker is determined between the particular speaker and the common focus 40, the delay in the sound being emitted from a particular speaker is equal to the maximum distance minus the particular distance divided by the speed of sound $V_s$.

$$(D_{max}-D_1)/V_s=\text{Delay in seconds}$$

As shown in FIG. 2, four representative speakers are arranged in a linear array. The first speaker 50 is closest to a target represented by the ear 52. A second speaker 54 is slightly more distant, a third speaker 56 more distant still, and a fourth speaker 58 is still more distant. An identical audio signal i.e. a time varying audio drive voltage, is supplied to each speaker 50, 54, 56, 58, but the signal is delayed in time so that the audio output 60 of the fourth speaker 58 begins first, followed by the audio output 62 of the third speaker 56, then the audio output 64 of the second speaker 54 and lastly the audio output 66 of the first speaker 50. The audio outputs 60, 62, 64, 66, because of the varying delays, each reach a sphere 68 which is centered about the target 52 at the same time and propagate forward reaching the target 52 to constructively interfere producing an increased volume of sound in the volume of constructive interference.

A time varying audio drive voltage with the correct delay for each speaker 50, 54, 56, 58 is created from a single audio source 70, as shown in FIG. 2. The audio source, if an analog source, is digitally sampled by a A/D converter 72. A typical digital signal is sampled 44,000 times per second which is the standard for reproducing audio frequency sound with an acceptable level of distortion. If the audio source is digital the existing digital samples may be stored directly in the memory storage register 78 of the memory stack 76.

The maximum delay needed is proportional to the maximum difference in distance between any two speakers of of the array 20 and the target which is the discrete region 40. The speed of sound in air at room temperature is approximately 1,000 fps. For each speaker 22, the target distance is the distance between that speaker and the target 40. The maximum delay needed is the maximum difference between the target distances of any two speakers 22 divided by 1,000. The maximum difference in the target distances of any two speakers must necessarily be less than the maximum dimension of the speaker array 20, which must be less than the maximum dimension of the room in which the speakers are situated. The precise amount of delay necessary will of course be dependent on the position of the target 40 in space relative to the array 20. Because the location of the target 40 may be adjustable either in real-time, or at set intervals, the amount of delay may be simply taken as the maximum room dimension or the maximum array dimension, or by looking at a particular situation to determine the actual needed delay.

A digital sample can be simply thought of as the amplitude of an audio signal at a particular point in time. The amplitude of the audio signal is the sum of the amplitude of all audio frequencies present. As will be understood by those skilled in the art of audio frequency sound reproduction the sample frequency must be sufficiently higher than the highest frequency which it is desired to reproduce, and various analog/or digital filtering must be used to reduce the effects of digital sampling on signal quality.

The A/D converter 72 produces a standard digital signal comprised of a series of values corresponding to each timed sample of the audio signal taken each 1/44,000th of a second. The samples 74 are sent to the memory stack 76 which are incremented with the addition of each new sample, incrementing the previously stored samples to the next memory storage register 78. Each location in the memory stack will thus contain a digital word. The digital word will typically be a 16-bit word for standard sound quality, but could be of higher or lower precision. Because each additional storage register represents a time increment of 1/44,000th of a second, a storage register which contains a signal delayed by a selected amount can be determined by dividing the desired time delay by 44,000 to determine the address of the register which contains a signal with the selected delay. A computer or microprocessor 80 stores the sound samples and increments all the samples by 44,000 times a second. The total number of storage registers necessary depends on the total time delay needed which, as discussed above, is less than the maximum dimension of the speaker array 20. The total number of storage registers necessary is a product of the total time delay needed and the number of samples taken per second. The total delay time, as discussed above, is governed by the maximum dimension of the speaker array 20.

To provide an audio signal to each speaker, the computer controls a pointer 79 for each speaker which is directed to a particular memory register which is read out 44,000 times a second in synchronization with the memory registers being incremented. Each speaker 22 has a related pointer 79, and the computer 80 contains in memory all the pointers 79 which are collectively referred to as a pointer array. The end result is a digital signal with a selected delay which is which is converted to a time varying audio drive voltage, and applied to each individual speaker of the speaker array 20.

Referring to FIG. 1, a sound reproduction system 36 is shown producing a plurality of discrete sound regions 40.

The regions are positioned in front of pictures within a museum gallery 26. One person 42 stands in front of a first picture 44. Indicia 86, such as a “STAND HERE” legend on the floor, indicates where the person 42 should stand to hear a description of the first picture 44. At the same time, a second person 46 standing in a different part of the room is viewing a second picture 48. The second person’s head is positioned within a discrete region 40 which provides an audio description of the second picture 48. The “STAND HERE” legend on the floor provides information for gaining access to the sound target. Because people vary in height, two or more discreet audio regions 40 may be formed at different heights above the ground into which is broadcast the same audio track. Arrows 92 indicate sound which is being transmitted to constructively interfere to form the discrete regions 40. Although the sound is coming from all the speakers, or a substantial majority of the speakers, particularly those located in the vicinity of a particular discrete region 40, for clarity only a few arrows are shown.

To produce several sound regions 40 from a single array of speakers, a plurality of audio sources 94 are digitized by a plurality of A/D digital samplers 95, and storage in memory stacks 96 which are used to contained a multiplicity of sound samples 97 sequentially store from each audio source 94, to form an audio source signal. For a particular speaker 98, sound from each audio source signal will be delayed by a different amount so that the sound transmitted by each speaker 22 in the array 20 can contribute to the constructive interference of sound at a plurality of locations to create a plurality of sound regions each with their own soundtrack. Each particular speaker 98 is associated with a pointer 100 corresponding to each memory location which will produce a signal delay which will cause a particular signal to constructively interfere at a particular discrete region 40. Several such audio signals, with their characteristic delay may be increased or decreased in amplitude, by a volume control 108, which may be assembled digital multiplier. The amplitude adjusted audio signals are added with a digital adder 102 and converted to an analog signal with a digital-to-analog converter 104, then amplified by the amplifier 106. The signal associated with each particular set of pointers 100 is then sent to a particular speaker 98.

For the proper functioning of the sound reproduction system 36, each speaker must be connected to the output of the memory location which contains sound data with the proper delay value. If the discrete region in which it is desired to produce sound is at a fixed location, the fixed location with respect to the speaker array 20 can be used to solve for the necessary delay and thus each speaker can be connected to the memory location which produces sound with the proper delay. The set of data which is the proper delay for each speaker is a pointer matrix, and the value of the pointer matrix can be arrived at by calculation or empirically. If the focus of the array is progressively swept through the entire room, a microphone placed at the desired location 40 can readily detect when the progress of sweep has reached the desired location. Values contained in the pointer matrix when a test tone reaches a maximum volume at the test location can be saved and thereafter used to control each speaker time delay.

If it is desired to follow a person moving about a room with the discrete region 40 of increased sound volume, a tracking system may be employed to locate a wireless microphone placed on the person, preferably near the person’s ear. The tracking system creates an interrogating target focus. The interrogating target focus is a sub-audible tone pattern that is localized in three-dimensional space and continuously scanned through the listening room. The Listeners wears the wireless microphone and the listener’s location within the listening room is fixed in relation to the speaker array by sensing the time at which the signal from a given microphone reaches its maximum. Thus the pointer array is constantly updated with listener’s current location.

It should be noted that this method reduces the computational load of the CPU since it eliminates the need to calculate the delays to be programmed into the the pointer matrix as the target locations are identified empirically as the interrogating tone is scanned through the room. The process of scanning a tone target is a simple matter of incrementing in a predetermined fashion the data elements of the the pointer matrix for the target focus to be scanned through the room.

An experiment was performed to test the sound system of the invention by fabricating a 9×9 array of speakers 10 inches on center. The eighty-one speaker emitter panel was constructed using one-quarter-inch thick pegboard. Low power, three-inch round speakers rated for 2 watts max were affixed to a mounting screw that extended from the back of each speaker co-located with the central axis of the cone of that speaker. The speakers were placed on a 10" grid pattern and affixed to the peg board. A short length of PVC tubing was placed around the mounting screws so that the tubing would expand to fill the peg board hole as the screws was tightened. This arrangement served to acoustically isolate each speaker from one another as well as centered each speaker so that the axis of the cone of each speaker is normal to the plane of the emitter panel.

The speakers were wired to an 81 channel amplifier/phase delay apparatus. The apparatus use for producing individual delays for each of the 81 channels was composed of six digitally addressed multi-channel digital-to-analog converter printed circuit boards (D to A cards) and one digital signal processing printed circuit board (DSP card) that is capable of addressing each channel on each D to A card. The D to A cards and the DSP card were interconnected and powered via an ISA passive backplane of an IBM PC clone. The D to A cards as well as the DSP card were designed and laid out on an AT-ISA form factor to fit the passive backplane.

Each D to A card contained 16 channels of digital-to-analog converter circuitry. An 8 bit data byte was written to each individual channel. Individual channels were addressed by first enabling the entire board with a board enable signal that is generated by the DSP card. While a given card was enabled, a 4 bit digital address is driven on to the passive backplane bus. A unique address was generated by the 4 bits for each of the 16 channels on the D to A card. Latching the 8 bit data into an addressed channel was accomplished by driving the memory write signal to a logic low. The memory write signal was generated by the DSP card. Each channel of the D to A card was composed of an 8 bit data latch IC (74HC573); an 8 bit digital to analog converter IC (DAC08) that output a current that was proportional to a digital input value; and an operational amplifier configured to function as an analog current to voltage converter (LM741) sent its output voltage to an audio power amplifier (LM380). The audio power amplifier drove an individual speaker for that channel.

In addition to the circuits comprising the digital to analog converters, the D to A card also held the data bus receiver circuitry (74HC244), channel decoding circuitry 2 ea (74HC308) and logic NOR gates to combine the “memory write" signal with the channel select signal (output of the 74HC308) into a data latch enable signal used by the 74HC573.

The DSP card was comprised of Texas Instruments 32040 CODEC and a Texas Instruments 320C50 DSP. The CODEC contains the audio analog-to-digital converter that outputs 14 bit digital samples to the DSP to process. The operation of the system described to this point was synchronized to the sample rate of the CODEC.

The DSP performed the channel delay process by means of a first in, first out delay line. The amount of delay for any given channel was preprogrammed to produce the focus at the predetermined location in 3 dimensional space in front of the emitter panel. Each time the CODEC delivers a new sample to the DSP, it first updates the delay line, then it selects a sample for each digital-to-analog converter channel in the 81 channel array. The input latch to each channel was mapped into the memory map of the DSP. All 81 channels are written to, each with its own selected sample before the next new sample was delivered by the CODEC. The sample selected was determined from a delay pointer matrix that was a matrix of memory pointers that was preprogrammed into the DSP code at compile time. Each memory pointer in the matrix points to a specific address within the delay line. Each location in the delay line represents a specific amount of time delay that was equal to the amount of delay between samples multiplied by the number of memory locations the specific address was from the first location in the delay line. Thus the first location was the most recent sample. The length of the delay line used was 128 samples long. The apparatus allowed individual control of the delay of the audio signal to each speaker.

As discussed previously, eighty-one speakers should produce a sound intensity of approximately 19 dB above the volume of a single speaker, and when combined with time delays in accordance with the invention so that constructive interference is achieved for a selected region in space, a sound level of 38 dB above that produced by a single speaker should result, so that sound in a selected region should be 19 dB above the ambient sound levels. The data set produced below consists of sound level readings taken with a handheld meter which provided dB readings. The meter scale began at 40 dB, and meter readings were taken at 10 inch intervals on axis with the speakers. The sound delays were selected to produce a maximum volume at a region which was 60 inches in front of the speaker array and centered over the speaker which was in the fourth row from the top and sixth column from the left side. This reading, as indicated in the data set, was 59 dB. The ratings immediately surrounding the target point are 43, 42, 43, 43, 43, 42, 42, 43, and immediately in front of the target point 48, and immediately behind 46. And thus it is seen that the test apparatus produced a sound level which was approximately 16 dB above sound levels immediately adjacent to the target point, and generally at least 10 dB, above any other data point with the exception of a data point taken ten inches above a noisy speaker in this seventh row, six from the left, which was the result of a faulty amplifier driving a particular speaker.

$$\text{10 inches}\begin{bmatrix} 43 & 43 & 45 & 45 & 45 & 46 & 43 & 46 & 45 \\ 49 & 47 & 44 & 44 & 44 & 44 & 44 & 44 & 44 \\ 44 & 44 & 44 & 44 & 43 & 44 & 43 & 44 & 43 \\ 43 & 45 & 44 & 44 & 44 & 43 & 43 & 44 & 43 \\ 44 & 44 & 44 & 43 & 43 & 43 & 44 & 43 & 43 \\ 48 & 43 & 44 & 44 & 45 & 44 & 44 & 44 & 44 \\ 45 & 44 & 46 & 45 & 46 & 53 & 45 & 45 & 45 \\ 45 & 46 & 45 & 45 & 45 & 48 & 44 & 44 & 45 \\ 45 & 46 & 46 & 46 & 45 & 46 & 45 & 43 & 45 \end{bmatrix}$$

$$\text{20 inches}\begin{bmatrix} 45 & 44 & 45 & 46 & 45 & 45 & 44 & 45 & 44 \\ 45 & 46 & 45 & 45 & 45 & 44 & 45 & 45 & 44 \\ 45 & 45 & 44 & 44 & 45 & 45 & 44 & 45 & 44 \\ 43 & 44 & 45 & 44 & 45 & 44 & 44 & 44 & 43 \\ 45 & 43 & 43 & 45 & 45 & 45 & 45 & 45 & 44 \\ 44 & 44 & 43 & 43 & 44 & 45 & 43 & 44 & 43 \\ 43 & 42 & 43 & 43 & 44 & 49 & 44 & 43 & 42 \\ 43 & 43 & 42 & 43 & 44 & 45 & 44 & 43 & 42 \\ 43 & 42 & 42 & 42 & 43 & 43 & 43 & 43 & 42 \end{bmatrix}$$

$$\text{30 inches}\begin{bmatrix} 43 & 43 & 42 & 43 & 40 & 41 & 41 & 42 & 41 \\ 43 & 43 & 42 & 43 & 43 & 43 & 42 & 44 & 42 \\ 43 & 45 & 43 & 43 & 44 & 44 & 43 & 43 & 42 \\ 42 & 43 & 44 & 43 & 44 & 43 & 43 & 43 & 43 \\ 43 & 43 & 42 & 43 & 43 & 45 & 43 & 43 & 43 \\ 43 & 43 & 43 & 44 & 45 & 46 & 44 & 44 & 43 \\ 43 & 43 & 43 & 43 & 44 & 45 & 45 & 44 & 43 \\ 43 & 43 & 44 & 46 & 45 & 45 & 45 & 44 & 43 \\ 43 & 44 & 44 & 44 & 44 & 45 & 44 & 43 & 43 \end{bmatrix}$$

$$\text{40 inches}\begin{bmatrix} 43 & 43 & 43 & 44 & 43 & 43 & 43 & 43 & 44 \\ 43 & 43 & 43 & 43 & 43 & 43 & 43 & 42 & 42 \\ 43 & 43 & 43 & 43 & 43 & 44 & 43 & 43 & 42 \\ 43 & 44 & 44 & 43 & 45 & 44 & 44 & 43 & 43 \\ 43 & 45 & 42 & 43 & 43 & 44 & 43 & 42 & 42 \\ 43 & 43 & 43 & 43 & 44 & 44 & 43 & 43 & 41 \\ 43 & 43 & 43 & 44 & 43 & 45 & 44 & 43 & 40 \\ 43 & 44 & 44 & 43 & 44 & 46 & 45 & 44 & 43 \\ 42 & 41 & 43 & 43 & 43 & 46 & 43 & 43 & 43 \end{bmatrix}$$

$$\text{50 inches}\begin{bmatrix} 42 & 41 & 43 & 43 & 41 & 43 & 41 & 42 & 42 \\ 41 & 42 & 42 & 41 & 42 & 42 & 42 & 40 & 41 \\ 42 & 42 & 42 & 42 & 42 & 43 & 42 & 41 & 41 \\ 42 & 43 & 44 & 43 & 42 & 48 & 43 & 42 & 44 \\ 43 & 43 & 42 & 43 & 43 & 43 & 42 & 42 & 42 \\ 42 & 42 & 43 & 43 & 43 & 43 & 43 & 42 & 42 \\ 42 & 43 & 48 & 43 & 43 & 45 & 43 & 42 & 43 \\ 43 & 46 & 44 & 43 & 44 & 45 & 45 & 43 & 44 \\ 43 & 44 & 43 & 43 & 43 & 44 & 44 & 44 & 43 \end{bmatrix}$$

-continued $$\text{60 inches}\begin{bmatrix} 40 & 42 & 43 & 43 & 42 & 42 & 42 & 40 & 43 \\ 43 & 42 & 42 & 42 & 42 & 42 & 42 & 42 & 42 \\ 43 & 43 & 43 & 43 & 43 & 42 & 43 & 43 & 42 \\ 43 & 45 & 49 & 43 & 43 & 59 & 43 & 42 & 43 \\ 42 & 42 & 42 & 42 & 42 & 42 & 43 & 42 & 41 \\ 42 & 42 & 42 & 42 & 43 & 42 & 43 & 42 & 42 \\ 40 & 40 & 43 & 42 & 43 & 48 & 42 & 40 & 43 \\ 42 & 43 & 43 & 42 & 42 & 45 & 42 & 42 & 42 \\ 42 & 40 & 43 & 42 & 43 & 43 & 42 & 40 & 42 \end{bmatrix}$$

$$\text{70 inches}\begin{bmatrix} 43 & 42 & 43 & 42 & 42 & 42 & 42 & 41 & 42 \\ 43 & 42 & 42 & 42 & 42 & 42 & 42 & 42 & 40 \\ 40 & 40 & 41 & 41 & 40 & 42 & 43 & 42 & 40 \\ 43 & 45 & 44 & 42 & 40 & 46 & 44 & 43 & 43 \\ 43 & 43 & 44 & 44 & 43 & 43 & 43 & 43 & 43 \\ 44 & 43 & 43 & 43 & 43 & 43 & 42 & 42 & 41 \\ 42 & 43 & 45 & 40 & 42 & 47 & 43 & 42 & 42 \\ 43 & 43 & 43 & 43 & 43 & 45 & 42 & 43 & 43 \\ 43 & 43 & 44 & 43 & 43 & 45 & 43 & 43 & 43 \end{bmatrix}$$

$$\text{80 inches}\begin{bmatrix} 43 & 43 & 43 & 43 & 42 & 41 & 42 & 43 & 42 \\ 41 & 42 & 42 & 42 & 42 & 42 & 43 & 43 & 42 \\ 43 & 43 & 43 & 42 & 42 & 43 & 43 & 42 & 42 \\ 43 & 45 & 44 & 42 & 42 & 44 & 43 & 42 & 42 \\ 42 & 42 & 41 & 42 & 42 & 42 & 43 & 42 & 41 \\ 42 & 42 & 42 & 42 & 42 & 42 & 42 & 42 & 41 \\ 42 & 43 & 42 & 42 & 42 & 45 & 40 & 42 & 42 \\ 40 & 42 & 43 & 42 & 42 & 45 & 43 & 42 & 40 \\ 42 & 40 & 40 & 42 & 40 & 45 & 40 & 42 & 40 \end{bmatrix}$$

$$\text{90 inches}\begin{bmatrix} 40 & 40 & 40 & 40 & 40 & 40 & 41 & 41 & 42 \\ 41 & 41 & 41 & 42 & 40 & 42 & 40 & 42 & 42 \\ 42 & 42 & 42 & 41 & 42 & 42 & 42 & 42 & 42 \\ 43 & 45 & 43 & 42 & 42 & 44 & 43 & 42 & 42 \\ 43 & 42 & 42 & 42 & 40 & 42 & 42 & 42 & 41 \\ 42 & 42 & 42 & 42 & 42 & 43 & 42 & 42 & 42 \\ 42 & 43 & 42 & 42 & 42 & 44 & 43 & 42 & 42 \\ 42 & 43 & 43 & 43 & 43 & 44 & 42 & 42 & 42 \\ 43 & 43 & 43 & 43 & 42 & 43 & 43 & 43 & 43 \end{bmatrix}$$

$$\text{100 inches}\begin{bmatrix} 40 & 40 & 40 & 40 & 40 & 40 & 40 & 40 & 40 \\ 42 & 42 & 42 & 42 & 42 & 42 & 42 & 42 & 42 \\ 43 & 42 & 43 & 42 & 42 & 42 & 42 & 42 & 41 \\ 40 & 41 & 42 & 42 & 40 & 42 & 42 & 41 & 41 \\ 42 & 42 & 42 & 42 & 41 & 42 & 41 & 42 & 41 \\ 40 & 40 & 41 & 40 & 41 & 42 & 41 & 40 & 40 \\ 42 & 42 & 42 & 42 & 42 & 43 & 43 & 42 & 41 \\ 42 & 42 & 42 & 42 & 42 & 43 & 42 & 43 & 42 \\ 42 & 43 & 42 & 42 & 42 & 43 & 43 & 42 & 42 \end{bmatrix}$$

It should be understood that the amplitude of each speaker maybe adjusted to improve the sound volume in a particular discrete region 40. Alternatively, speaker volume may be adjusted to reduce volume in a particular region where sound is unintentionally audible above background noise levels. Such regions might arise due to room acoustics, or speaker array geometry. Heuristic computer algorithms working with microphones placed between speakers in the array, or with microphones moved about a room could use fuzzy logic systems, or other systems of systematic or random variations to achieve a maximum volume of sound at discreet locations while simultaneously minimizing sound present outside of the discrete locations. By adjusting the variables of delay and volume of each speaker, a heuristic approach can be taken to find solutions which are better than those based on assumptions about room and speaker acoustics. Even moderately sized rooms can allow a new sound response to be established many times a second allowing thousands of iterations to be performed in a few minutes. These iterations may simultaneously be performed at multiple frequencies.

It should be understood that when, a means for applying a time varying audio drive voltage, i.e. the signal used to drive individual speakers is described as substantially identical, the signals are defined as being substantially identical, although they vary in amplitude. The term, substantially identical, means capable of constructive interference when used in the sound system 36 of this invention.

It should be understood that D class amplifiers which utilize pulse width modulation to drive audio speakers directly from line voltage could be used to drive the speakers 22 of the sound reproduction system 36. This approach eliminates the need for audio amplifiers and has greatly increased efficiency in converting electrical power into audio output. D class amplifiers thus require only a power source and the digital input to drive the speakers. As shown in FIG. 4, a ceiling tile 28 containing a multiplicity of speakers can be arranged to receive power and digital information addressed to each speaker. It is likely that a single integrated chip could contain all the components necessary to receive the digital output over a network, such as ethernet, and to drive the speakers. Because of a very low power, in some applications, thousandths to perhaps hundredths of a Watt output for each speaker in the array, it is possible that the audio speaker could be fabricated on the same chip as the network connection and D class amplifier.

It should be understood that stereo sound without headphones could be produced by creating discrete regions in space 40 which are closely spaced and contained the left and right channels making up the stereo signal, so that when properly positioned, a person could hear stereo sound. Noise cancellation with the sound system 36 is also possible, particularly where the noise to be canceled can be predicted, either by monitoring the noise at its source, or because the noises is of periodic nature.

In should be understood that the speakers 22 are preferably mounted on the ceiling in part because this will minimize interference of objects and persons with the sound transmitted from the speakers to create the discrete regions in space 40. However the sound system 36 is inherently resistant to being blocked by objects and persons especially when the array 20 is spread over a wide area, so that sound reaches the discrete regions in space over a wide angle of convergence.

It should be understood that the sound system of this invention can provide distinct and controllable volume levels for different individuals in the same listening room. It should also be understood that the sound system of this invention can be used to create multilingual school rooms or auditoriums where listeners if properly equipped with a locating device or seated in the proper location can hear a presenter in his or her own language without the use of cumbersome headphones.

A sound system of this invention may also make possible having both edited and non-edited versions of motion picture film dialog presented to the same audience at the same time, or even different plot lines could be presented to different portions of the audience. Hands-free phone operation might be achieved in open office environments while still maintaining private conversation. Buildings so equipped could take advantage of listener tracking to automatically route telephone and intercom signals to the desired recipient without the need of a handset, or a public address system which is heard by all.

It should further be understood that the sound produced by the sound system of this invention is a 'real image' which actually comes from the location it appears to come from, creating many opportunities for sound reproduction and special effects of video games, Multimedia presentations and high fidelity music.

It is understood that the invention is not limited to the particular construction and arrangement of parts herein illustrated and described, but embraces such modified forms thereof as come within the scope of the following claims.

I claim:

1. A speaker system for producing localized regions of sound comprising:

a multiplicity of audio frequency speakers;

at least one defined sound target spaced from each of the speakers of the multiplicity of speakers, wherein each speaker has a means for applying a time varying audio drive voltage which is substantially identical, except that each audio drive voltage is offset in time by an amount which is related to the distance between each speaker and the defined sound target, so that substantially identical sound from each speaker reaches the sound target at the same time;

wherein the speakers are arranged in a single plane;

further comprising a room having a ceiling, and wherein the speakers are mounted to the ceiling; and wherein each of the multiplicity of audio frequency speakers is formed as part of a ceiling panel which can be joined to a further ceiling and panel, to communicate power and data between said ceiling panel and said further ceiling panel.

2. A speaker system for producing localized regions of sound comprising:

a multiplicity of audio frequency speakers;

at least one defined sound target spaced from each of the speakers of the multiplicity of speakers, wherein each speaker has a means for applying a time varying audio drive voltage which is substantially identical, except that each audio drive voltage is offset in time by an amount which is related to the distance between each speaker and the defined sound target, so that substantially identical sound from each speaker reaches the sound target at the same time;

at least a first defined sound target and a second defined sound target, the second sound target being spaced from the first sound target, and the first sound target and the second sound target being spaced from each of the speakers of the multiplicity of speakers, and wherein the means for applying a time varying audio drive voltage comprises:

at least a first audio source which is offset in time by an amount which is related to the distance between each speaker and the first defined sound target; and at least a second audio source which is offset in time by an amount which is related to the distance between each speaker and the second defined sound target wherein a sum of the first audio source which is offset in time and the second audio source which is offset in time is used to produce the time varying audio drive voltage so that substantially identical sound from the first audio source signal reaches the first sound target at the same time, and substantially identical sound from the second audio source signal reaches the second target at the same time.

3. A speaker system for producing localized regions of sound comprising:

a multiplicity of audio frequency speakers;

at least one defined sound target spaced from each of the speakers of the multiplicity of speakers, wherein each speaker has a means for applying a time varying audio drive voltage which is substantially identical, except that each audio drive voltage is offset in time by an amount which is related to the distance between each speaker and the defined sound target, so that substantially identical sound from each speaker reaches the sound target at the same time; and wherein the means for applying a time varying audio drive voltage includes a class D amplifier.

4. A speaker system for producing localized regions of sound comprising:

at least 100 audio frequency sound speakers arranged spaced apart in an array, in a space filled with air;

a first sound target spaced from the array;

a second sound target spaced from the array;

a means for determining the distance between each speaker and the first sound target;

a means for determining the distance between each speaker and the second sound target;

a first audio source;

a second audio source;

a means for delaying in time transmission of the first audio source to each one of the speakers by an amount of time which is related to the distance between each one of the speakers and the first sound target;

a means for delaying in time transmission of the second audio source to each one of the speakers by an amount of time which is related to the distance between each one of the speakers and the second sound target; and a means for adding together the first audio signal and the second audio signal to create a combined signal, and supplying said combined signal to each sound speaker so that sound produced by each of the at least 100 speakers generates a first localized region of sound at the first sound target and a second localized region of sound at the second sound target.

5. The speaker system of claim 4 wherein the speakers are arranged in a single plane.

6. The speaker system of claim 4 further comprising a room having a ceiling wherein the speakers are mounted to the ceiling.

7. The speaker system of claim 5 wherein each of the multiplicity of audio frequency speakers is formed as part of a ceiling panel which can be joined together to communicate power and data.

8. The speaker system of claim 4 further comprising:

a room; and indicia positioned within the room providing information for gaining access to the sound target.

9. The speaker system of claim 4 wherein the means for adding together the first audio signal and the second audio signal includes a class D amplifier driving each speaker.

10. A method of producing a region of localized sound intensity in air which is spaced from a source of sound generation, comprising the steps of:

selecting a region in space for creating a region of localized sound having a first sound amplitude;

positioning a multiplicity of spaced apart audio frequency sound sources spaced from the region in space, each audio frequency sound source defining a distance between each sound source and the selected region in space;

emitting from each sound source a sound having a second sound amplitude which is at least 20 dB less than the first sound amplitude;

creating the region of localized sound having the first sound amplitude by emitting from each sound source a substantially identical sound wave, wherein each substantially identical sound wave is delayed in time as emitted by each sound source of the multiplicity of sound sources by an amount of time which is related in such a way to the defined distance between each sound source and the region in space, so that the substantially identical sound waves constructively interfere to produce the region of localized sound having the first sound amplitude.

11. The method of claim 10 wherein the sound sources are arranged in a single plane.

12. The method of claim 10 wherein the sound sources are formed as part of ceiling panels which are joined together to communicate power and data.

13. The method of claim 10 further comprising a step of directing a listener to the region of localized sound.

14. The method of claim 10 wherein the step of creating the sound wave of the first sound amplitude includes the step of sending a digitized waveform through a class D amplifier to each sound source.

15. The method of claim 10 further comprising:

selecting a second region in space for creating a second region of localized sound having a third amplitude, wherein each of the audio frequency sound sources defines a second distance between each sound source and the selected second region in space;

emitting from each sound source a second substantially identical sound wave at a fourth sound amplitude which is at least 20 dB less than the third amplitude;

creating the sound wave of the third amplitude by the emitting from each sound source the second substantially identical sound wave, wherein the second substantially identical sound wave is delayed in time as emitted by each sound source of the multiplicity of sound sources by an amount of time which is related in such a way to the defined second distance between each sound source and the second region in space, so that the second substantially identical sound waves constructively interfere to produce the second region of localized sound having the third amplitude.

16. A speaker system for producing at least one localized region of sound, comprising:

a first audio source;

a central processing unit;

an array of speakers in fixed relation to one another;

a first stack of data registers maintained by the central processing unit, wherein samples of the first audio source are taken at selected intervals, and are stored in the first stack of data registers, the location of each sample being incremented sequentially through the first stack of data registers as each subsequent sample is taken; and a first pointer array maintained by the central processing unit, the first pointer array having a pointer corresponding to each of the speakers in the array, and pointing to one of the first stack of data registers corresponding to the time delay necessary to cause the sound emitted by each speaker to reach a first localized region of sound substantially simultaneously, the central processing unit simultaneously reading the changing contents of a data register associated with a particular pointer to a particular speaker, wherein the volume of the sound produced by each speaker in the array is at least 20 dB below the sound volume of the sound emitted at the first localized region of sound.

17. The speaker system of claim 16 further comprising:

a second audio source;

a second stack of data registers maintained by the central processing unit, wherein samples of the second audio source are taken at the selected intervals and are stored in the second stack of data registers, the location of each sample being incremented sequentially through the second stack of data registers as each subsequent sample of the second audio source is taken; and a second pointer array maintained by the central processing unit, the second pointer array having a pointer corresponding to each of the speakers in the array, and pointing to one of the second stack of data registers corresponding to the time delay necessary to cause the sound emitted by each speaker to reach a second localized region of sound substantially simultaneously, wherein the samples of each first stack register and second stack register corresponding to a particular speaker are added and supplied to the particular speaker to produce both the first localized region of sound and a second localized region of sound spaced from the first localized region of sound.

18. The speaker system of claim 16 further comprising a microphone mounted to a listener, the microphone in wireless communication with the central processing unit, such that the central processing unit may direct an interrogating frequency throughout a volume to determine the location of the microphone and thereby determine the desired position of the first localized region of sound.

19. The speaker system of claim 17 wherein the first audio source includes speech in a first language, and the second audio source includes speech in a second, different, language.

* * * * *

UNITED STATES PATENT AND TRADEMARK OFFICE

CERTIFICATE OF CORRECTION

PATENT NO. : 7,130,430 B2
APPLICATION NO. : 10/024159
DATED : October 31, 2006
INVENTOR(S) : Jeffrey P. Milsap It is certified that error appears in the above-identified patent and that said Letters Patent is hereby corrected as shown below:

In column 14, line 49, after “each” and before “speaker” delete “sound”

Signed and Sealed this

Sixth Day of February, 2007

JON W. DUDAS
*Director of the United States Patent and Trademark Office*